United States Patent
Cudak et al.

(10) Patent No.: US 9,442,770 B1
(45) Date of Patent: Sep. 13, 2016

(54) WORKLOAD EXECUTION TIMING DEVICE IN A VIRTUAL MACHINE ENVIRONMENT

(71) Applicant: LENOVO Enterprise Solutions (Singapore) PTE. LTD., New Tech Park (SG)

(72) Inventors: Gary D. Cudak, Wake Forest, NC (US); Shareef F. Alshinnawi, Apex, NC (US); Jeffrey S. Holland, Newton, NC (US); Pradeep Ramineni, Cary, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 14/730,979

(22) Filed: Jun. 4, 2015

(51) Int. Cl.
*G06F 9/46* (2006.01)
*G06F 9/50* (2006.01)

(52) U.S. Cl.
CPC .................... *G06F 9/505* (2013.01)

(58) Field of Classification Search
CPC .............................. G06F 9/505; G06F 9/5083
USPC ................................................. 718/100–108
See application file for complete search history.

(56) References Cited

U.S. PATENT DOCUMENTS

| | | | | |
|---|---|---|---|---|
| 7,451,448 B1 * | 11/2008 | Rhee | ...................... | G06F 9/5027 709/225 |
| 7,454,754 B2 * | 11/2008 | Tajima | .................. | G06F 9/4881 709/226 |
| 7,526,765 B2 * | 4/2009 | Lin | ........................ | G06F 9/4887 718/100 |
| 7,735,086 B2 * | 6/2010 | Hellerstein | ............... | G06F 8/60 718/105 |
| 7,958,507 B2 * | 6/2011 | Santos | .................. | G06F 9/4887 718/100 |
| 8,136,118 B2 * | 3/2012 | Di Luoffo | ............. | G06F 9/5088 718/102 |
| 8,219,997 B2 * | 7/2012 | Shimizu | ................ | G06F 9/5066 718/104 |
| 8,271,980 B2 * | 9/2012 | Jackson | ................ | G06F 9/4843 718/100 |
| 8,281,311 B2 * | 10/2012 | Barsness | ............... | G06F 9/5072 718/104 |
| 8,391,219 B2 * | 3/2013 | Ishii | ......................... | H04L 1/18 370/329 |
| 8,418,179 B2 * | 4/2013 | Papakipos | ............. | G06F 9/5027 717/140 |
| 8,418,186 B2 * | 4/2013 | Jackson | .................... | G06F 9/50 709/223 |
| 8,561,074 B2 * | 10/2013 | Cherkasova | ........ | G06F 11/1461 718/100 |
| 8,615,764 B2 * | 12/2013 | Salapura | ............... | G06F 9/5061 718/102 |
| 8,914,515 B2 * | 12/2014 | Alapati | ................. | G06F 9/5072 709/224 |
| 9,021,490 B2 * | 4/2015 | Marchand | ............. | G06F 9/4881 718/104 |

OTHER PUBLICATIONS

Kim et al, "Task-aware Virtual Machine Scheduling for I/O Performance", ACM, pp. 1-10, 2009.*

(Continued)

*Primary Examiner* — Anil Khatri
(74) *Attorney, Agent, or Firm* — Kunzler Law Group; Katherine S. Brown

(57) ABSTRACT

An apparatus for workload execution timing is disclosed. A method and a computer program product also perform the functions of the apparatus. The apparatus includes a job determination module that determines jobs to be executed by a computer system. The apparatus includes a comparison module that compares an execution profile of each job with a resource of a device of the computer system. The execution profile of each job includes an amount of a resource of a device used by the respective job over time. The apparatus includes a scheduling module that determines a schedule that indicates a time to execute each job on the device based on the comparison. Each job is scheduled to maintain a utilization of the resource of the device of the computer system below a maximum threshold. The apparatus includes an execution module that submits the jobs for execution based on the schedule.

20 Claims, 6 Drawing Sheets

(56) References Cited

OTHER PUBLICATIONS

Masrur et al, "Designing VM Schedulers for Embedded Real-Time Applications", ACM, 29-38, 2011.*
Smith et al, "An Object-Oriented Job Execution Environment", IEEE, pp. 1-13, 2000.*
Snavely et al, "Symbiotic Jobscheduling with Priorities for a Simultaneous Multithreading Processor", ACM, pp. 1-11, 2002.*
Muthuvelu et al, "A Dynamic Job Grouping-Based Scheduling for Deploying Applications with Fine-Grained Tasks on Global Grids" ACM, pp. 41-45, 2008.*
Moreira et al, "Scheduling Multiple Independent Hard-Real-Time Jobs on a Heterogeneous Multiprocessor", ACM, pp. 57-66, 2007.*
Schuurman et al, "Preemptive scheduling with job-dependent setup times", ACM, pp. 1-9, 1999.*
Asit K. Mishra et. al., "Towards Characterizing Cloud Backend Workloads: Insights from Google Compute Clusters" The Pennsylvania State University Park, PA-16801, USA 2009.
Peter Bodik et al., "Characterizing, Modeling, and Generating Workload Spikes for Stateful Services" EECS Department, UC Berkeley, Berkeley, CA, USA Jun. 10-11, 2010.

* cited by examiner

WORKLOAD EXECUTION TIMING DEVICE IN A VIRTUAL MACHINE ENVIRONMENT

FIELD

The subject matter disclosed herein relates to workload execution and more particularly relates to a device for timing workload execution.

BACKGROUND

Description of the Related Art

Information handling devices, such as desktop computers, laptop computers, tablet computers, smart phones, optical head-mounted display units, smart watches, etc., are ubiquitous in society. An information handling device generally includes one or more hardware devices used to execute workloads. The one or more hardware devices may be underutilized and/or over utilized during execution of the workloads.

BRIEF SUMMARY

An apparatus for workload execution timing is disclosed. A method and a computer program product also perform the functions of the apparatus. The apparatus includes a job determination module that identifies multiple jobs to be executed by a computer system. The apparatus includes a comparison module that compares an execution profile of each job of the multiple jobs with a resource of a device of the computer system. The execution profile of each job includes an amount of a resource of a device used by the respective job over time. The apparatus includes a scheduling module that determines a schedule that indicates a time to execute each job of the multiple jobs on the device based on the comparison between the execution profile of each job of the multiple jobs and the resource of the device of the computer system. Each job of the multiple jobs is scheduled to maintain a utilization of the resource of the device of the computer system below a maximum threshold. The apparatus includes an execution module that submits the multiple jobs for execution based on the schedule.

In one embodiment, the apparatus includes a profile determination module that determines the execution profile of each job of the multiple jobs based on a prior execution of the respective job. The apparatus, in another embodiment, includes a profile determination module that determines the execution profile of each job of the multiple jobs by predicting the execution profile of the respective job. In such an embodiment, predicting the execution profile of the respective job may include using an execution profile of a similar job to the respective job to predict the execution profile.

In one embodiment, the execution profile of each job comprises a ramp up time period, a general execution time period, and a ramp down time period. In such an embodiment, the ramp up time period may include a first time period during which the execution profile transitions from using substantially no amount of a resource of a device to using some amount of the resource of the device, and the ramp down time period may include a second time period during which the execution profile transitions from using some amount of the resource of the device to using substantially no amount of the resource of the device. In another embodiment, the multiple jobs may include a first job and a second job, and the ramp down time period of the first job may overlap with the ramp up time period of the second job while maintaining the utilization of the resource of the device of the computer system below the maximum threshold.

In one embodiment, the multiple jobs include at least one complex job that is executed using multiple devices of the computer system. In such an embodiment, the multiple devices may include one or more of a processor, a storage device, a hard drive, a memory, a cache, a redundant array of independent disks ("RAID") card, a network adaptor, an input/output ("IO") component, a graphics interface, a graphics processor, an expansion device, and an external device. In some embodiments, the scheduling module may include a utilization limiting module that maintains a utilization of resources of each device of the multiple devices of the computer system below a maximum threshold. In one embodiment, the scheduling module may include a utilization maximizing module that maintains the utilization of resources such that at least one device of the multiple devices of the computer system has a utilization greater than a target utilization threshold. In another embodiment, the scheduling module includes a utilization maximizing module that schedules each job of the multiple jobs to maximize a time that the utilization of the resource of the device of the computer system is above a target utilization threshold.

A method for workload execution timing includes identifying multiple jobs to be executed by a computer system. The method includes comparing an execution profile of each job of the multiple jobs with a resource of a device of the computer system. In some embodiments, the execution profile of each job includes an amount of a resource of a device used by the respective job over time. The method includes determining a schedule that indicates a time to execute each job of the multiple jobs on the device based on the comparison between the execution profile of each job of the multiple jobs and the resource of the device of the computer system. In certain embodiments, each job of the multiple jobs may be scheduled to maintain a utilization of the resource of the device of the computer system below a maximum threshold. The method includes submitting the multiple jobs for execution based on the schedule.

In one embodiment, the method includes determining the execution profile of each job of the multiple jobs based on a prior execution of the respective job. In another embodiment, the execution profile of each job includes a ramp up time period, a general execution time period, and a ramp down time period. In such an embodiment of the method, the ramp up time period may include a first time period during which the execution profile transitions from using substantially no amount of a resource of a device to using some amount of the resource of the device, and the ramp down time period may include a second time period during which the execution profile transitions from using some amount of the resource of the device to using substantially no amount of the resource of the device.

In one embodiment, the multiple jobs include a first job and a second job. In such an embodiment, the ramp down time period of the first job may overlap with the ramp up time period of the second job while maintaining the utilization of the resource of the device of the computer system below the maximum threshold. In another embodiment, each job of the multiple jobs is scheduled to maximize a time that the utilization of the resource of the device of the computer system is above a target utilization threshold. In some embodiments, the multiple jobs include at least one complex job that is executed using multiple devices of the computer system. In such embodiments, the multiple devices may include one or more of a processor, a storage device, a hard drive, a memory, a cache, a redundant array of independent disks ("RAID") card, a network adaptor, an input/output ("IO") component, a graphics interface, a graphics processor, an expansion device, and an external device.

A computer program product for workload execution timing includes a computer readable storage medium having program instructions embodied therewith. In one embodiment, the program instructions may be executable by a processor for identifying multiple jobs to be executed by a computer system. In some embodiments, the program instructions may also be executable by the processor for comparing an execution profile of each job of the multiple jobs with a resource of a device of the computer system. In such embodiments, the execution profile of each job may include an amount of a resource of a device used by the respective job over time. In certain embodiments, the program instructions may be executable by the processor for determining a schedule that indicates a time to execute each job of the multiple jobs on the device based on the comparison between the execution profile of each job of the multiple jobs and the resource of the device of the computer system. In such embodiments, each job of the multiple jobs may be scheduled to maintain a utilization of the resource of the device of the computer system below a maximum threshold. In one embodiment, the program instructions may be executable by the processor for submitting the multiple jobs for execution based on the schedule.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
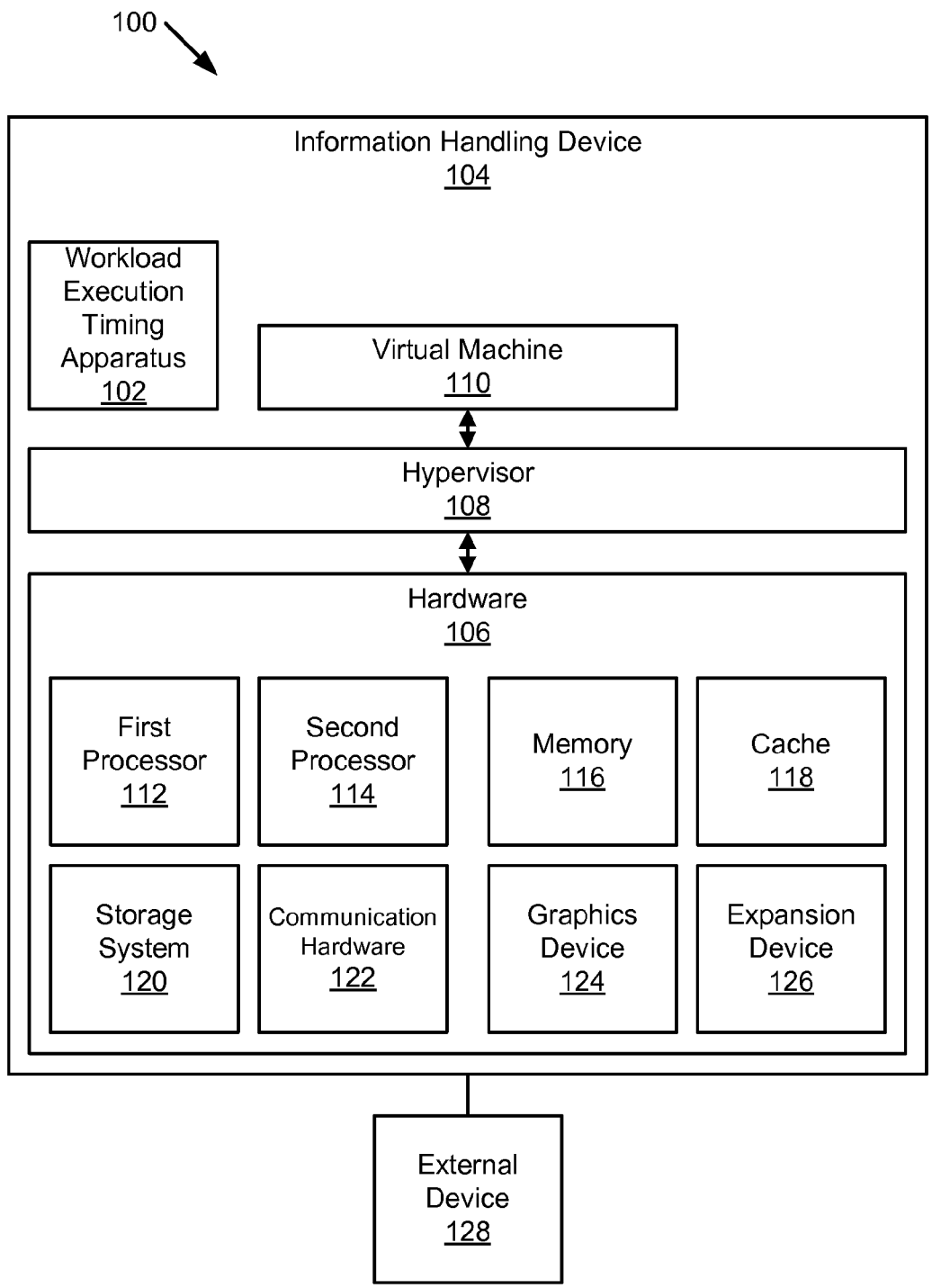
FIG. 1 is a schematic block diagram illustrating one embodiment of a computer system for workload execution timing in accordance with one embodiment of the present invention.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, program instructions, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. In one embodiment, a module may be implemented in hardware, for example as a hardware circuit comprising custom VLSI circuits or gate arrays, off-the-shelf semiconductors such as logic chips, transistors, or other discrete components. A module may also be implemented in hardware as programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java™, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment of a computer system 100 for workload execution timing in accordance with one embodiment of the present invention. The computer system 100 includes a workload execution timing apparatus 102 in an information handling device 104, wherein the information handling device 104 also includes hardware 106, a hypervisor 108, and a virtual machine 110, which are described below. Moreover, the hardware 106 includes a first processor 112, a second processor 114, a memory 116, a cache 118, a storage system 120, communication hardware 122, a graphics device 124, and an expansion device 126, which are described below. The computer system 100 also includes an external device 128, which is described below.

In general, the workload execution timing apparatus 102 provides a way to schedule the timing of multiple workloads (e.g., jobs) so that resources of the computer system 100 are used efficiently. For example, in one embodiment, the workload execution timing apparatus 102 identifies multiple jobs to be executed by the computer system 100. The workload execution timing apparatus 102 compares an execution profile of each job of the multiple jobs with a resource of a device of the computer system 100. The execution profile of each job includes an amount of a resource of a device used by the respective job over time. Moreover, the workload execution timing apparatus 102 determines a schedule that indicates a time to execute each job of the multiple jobs on the device based on the comparison between the execution profile of each job of the multiple jobs and the resource of the device of the computer system 100. Each job of the multiple jobs is scheduled to maintain a utilization of the resource of the device of the computer system 100 below a maximum threshold. The workload execution timing apparatus 102 submits the multiple jobs for execution based on the schedule. The workload execution timing apparatus 102 is described in more detail with regard to the apparatuses 200 and 300 of FIGS. 2 and 3.

The workload execution timing apparatus 102 is depicted in the information handling device 104, but may be located in various components and memory of the information handling device 104. For example, the workload execution timing apparatus 102 may include transducers, transistors, voltage regulators, digital signal processors, and other hardware. In another example, the workload execution timing apparatus 102 is implemented in software and all or a portion may be stored in the memory 116 on the information handling device 104. In another embodiment, the workload execution timing apparatus 102 is implements in software and hardware. One of skill in the art will recognize other implementations of the workload execution timing apparatus 102 using hardware, software, or both.

The information handling device 104 may include any device that may be used to execute workloads. For example, in one embodiment, the information handling device 104 includes a computing device, such as a desktop computer, a laptop computer, a personal digital assistant (PDA), a tablet computer, a smart phone, a smart television (e.g., televisions connected to the Internet), a set-top box, a game console, a security system (including security cameras), a vehicle on-board computer, or the like. In some embodiments, the information handling device 104 includes a wearable device, such as a smart watch, a fitness band, an optical head-mounted display, or the like. As may be appreciated, the computer system 100 may include any number of information handling devices 104, such as 2, 3, 4, 5, 10, or more information handling devices 104.

The hardware 106 includes multiple devices which may be used during execution of one or more workloads. As illustrated, the hardware 106 includes the first processor 112, the second processor 114, the memory 116, the cache 118, the storage system 120, the communication hardware 122, the graphics device 124, and the expansion device 126. In other embodiments, the hardware 106 may include fewer or more devices. For example, the hardware 106 may include more processors than the first and second processors 112 and 114. Moreover, the hardware 122 may include any suitable types of devices for executing one or more workloads.

While only one hypervisor 108 and one virtual machine 110 are illustrated, the computer system 100 may include one or more hypervisors 108 that use the hardware 106 to operate one or more virtual machines 110. In certain embodiments, the workload execution timing apparatus 102 may coordinate with the hypervisor 108 to use the hardware 106. In other embodiments, the workload execution timing apparatus 102 may access the hardware 106 directly.

The first and second processors 112 and 114, in one embodiment, may include any known controller capable of executing computer-readable instructions or code and/or capable of performing logical operations. For example, each of the first and second processors 112 and 114 may be a microcontroller, a microprocessor, a central processing unit ("CPU"), a graphics processing unit ("GPU"), an auxiliary processing unit, a field programmable gate array ("FPGA"), or similar programmable controller. In some embodiments, the first and second processors 112 and 114 execute instructions stored in the memory 116 to perform the methods and routines described herein. The first and second processors 112 and 114 are communicatively coupled to the memory 116, and the communication hardware 122.

The memory 116, in one embodiment, is a computer readable storage medium. In some embodiments, the memory 116 includes volatile computer storage media. For example, the memory 116 may include a random access memory ("RAM"), including dynamic RAM ("DRAM"), synchronous dynamic RAM ("SDRAM"), and/or static RAM ("SRAM"). In some embodiments, the memory 116 includes non-volatile computer storage media. For example, the memory 116 may include a hard disk drive, a flash memory, or any other suitable non-volatile computer storage device. In some embodiments, the memory 116 includes both volatile and non-volatile computer storage media.

In certain embodiments, the memory 116 stores data relating to operation of the workload execution timing apparatus 102. Moreover, in some embodiments, the memory 116 also stores program code and related data, such as an operating system or other controller algorithms operating on the information handling device 104.

The cache 118 stores data so future requests for that data may be served faster. The cache 118 may be any suitable cache, such as central processing unit ("CPU") cache, graphics processing unit ("GPU") cache, disk cache, web cache, and so forth. In some embodiments, the cache 118 may be part of the memory 116 and/or the storage system 120. The storage system 120 may be used to store any type of data. In some embodiments, the storage system 120 may include the memory 116 and the cache 118. In one embodiment, the storage system 120 may include a redundant array of independent disks ("RAID") card and/or a RAID system. In some embodiments, the storage system 120 may include one or more hard disks, one or more hard drives, one or more storage devices, and so forth.

The communication hardware 122 may facilitate communication with other devices. For example, the communication hardware 122 may enable communication via Bluetooth®, WiFi™, and so forth. In some embodiments, the communication hardware 122 may include one or more input/output ("IO") components, such as a keyboard, a mouse, a display, a printer, a network adaptor, a network interface card, and so forth. The graphics device 124 may include any device used to produce graphics. For example, the graphics device 124 may include a graphics interface, a graphics processor, a graphics card, and so forth.

The expansion device 126 may be any device that may be added to and/or included with the information handling device 104. In certain embodiments, the expansion device 126 may be include one or more of the first and second processors 112 and 114, the memory 116, the cache 118, the storage systems 120, the communication hardware 122, and/or the graphics device 124. In some embodiments, the expansion device 126 may include any suitable expansion card, such as a video card, an audio card, a modem card, a communications card, a riser card, a sound card, a network card, a TV tuner card, a host adapter, a disk controller card, an interface adaptor, a parallel port card, a serial port card, a multi-IO card, a universal serial bus ("USB") port card, a proprietary interface card, a solid-state drive, a memory expansion card, a security device card, a radio tuner card, and so forth.

The external device 128 may be any suitable device that may interface with the information handling device 104, such as a device that is not part of the information handling device 104. For example, the external device 128 may be a storage device, a network device, a network, another information handling device 104, a printer, a scanner, a monitor, a screen, a projector, a robot, a machine, a mechanical device, and so forth.

Figure 2:
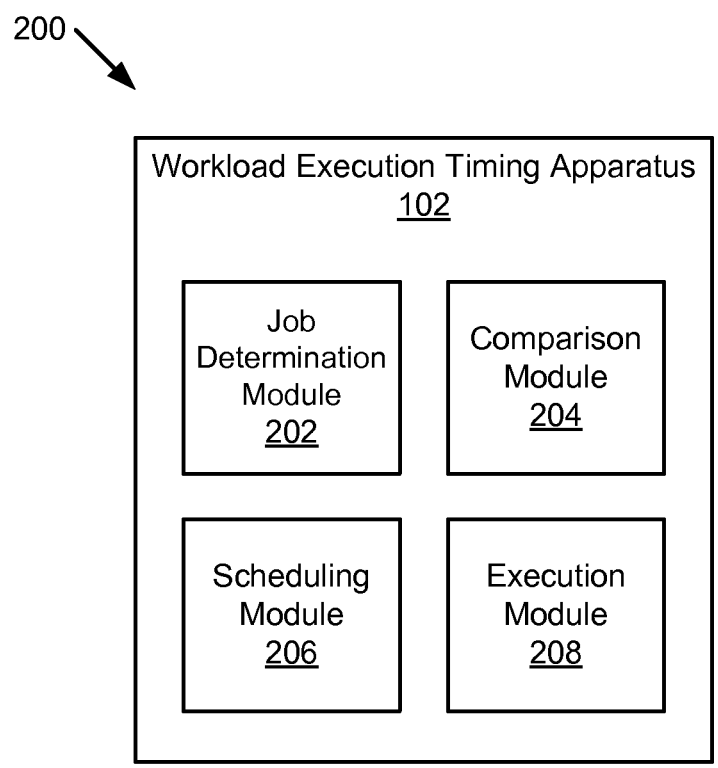
FIG. 2 is a schematic block diagram illustrating one embodiment of an apparatus for workload execution timing in accordance with one embodiment of the present invention.

FIG. 2 is a schematic block diagram illustrating one embodiment of an apparatus 200 for workload execution timing in accordance with one embodiment of the present invention. The apparatus 200 includes one embodiment of the workload execution timing apparatus 102 with a job determination module 202, a comparison module 204, a scheduling module 206, and an execution module 208, which are described below.

In one embodiment, the apparatus 200 includes the job determination module 202 that identifies multiple jobs to be executed by the computer system 100. Each job may be any suitable job (i.e., workload) that may be executed by the computer system 100. For example, in certain embodiments, the jobs may be related to weather processing, oil and gas technology, automotive technology, aircraft technology, and/or any type of data processing, simulation, or modeling, and so forth. Moreover, each job may be executed over any suitable period of time. For example, in some embodiments, one job may take up to 1, 5, 10, 30, 60, or more minutes to execute. As another example, in certain embodiments, one job may take up to 1, 2, 5, 12, 24, 48, or more hours to execute.

Certain jobs may be considered complex jobs because they are executed using multiple devices of the computer system 100. For example, a complex job may be executed using multiple processors, such as the first and second processors 112 and 114. In certain embodiments, the multiple devices of the computer system 100 may include any portion of the hardware 106 of the information handling device 104. In some embodiments, the multiple jobs to be executed may be identified based on jobs selected by a user for execution, jobs selected by an application for execution, recurring jobs, maintenance schedules, a priority ranking, a customer agreement, a support agreement, a purchase agreement, an account setting, a service level agreement, and so forth.

In one embodiment, the apparatus 200 includes the comparison module 204 that compares an execution profile of each job of the multiple jobs with a resource of a device of the computer system 100. In some embodiments, the execution profile of a job includes an actual profile from a previous execution of the job, or a prediction of an execution profile that may be based on the previous execution of a job similar to the job. The execution profile of each job includes an amount of a resource of a device used by the respective job over time. Certain examples of execution profiles are described in more detail in relation to FIGS. 4A-4C.

As may be appreciated, a job may use multiple resources of a device, and/or may use multiple devices. For example, a job using the memory 116 may use a first resource of the memory 116 that includes an amount of storage space of the memory 116, and a second resource of the memory 116 that includes a memory bandwidth. As another example, a job may use the first processor 112 and the memory 116. Accordingly, each job may have multiple execution profiles. In certain embodiments, a job may have a first execution profile for an amount of a first resource of a device used by the respective job over time, and a second execution profile for an amount of a second resource of the device used by the respective job over time. In some embodiments, a job may have a first execution profile for an amount of a resource of a first device used by the respective job over time, and a second execution profile for an amount of a resource of a second device used by the respective job over time. It should be noted that a job may have any number of execution profiles that may be based on the number of resources and number of devices used by the jobs. Moreover, in some embodiments, a job may use one resource of multiple devices in a single execution profile. For example, a job may use the first and second processors 112 and 114 for execution, and, therefore, may have a single execution profile that spans multiple devices.

In some embodiments, the apparatus 200 includes the scheduling module 206 that determines a schedule that indicates a time to execute each job of the multiple jobs on the device based on the comparison between the execution profile of each job of the multiple jobs and the resource of the device of the computer system 100. Each job of the multiple jobs is scheduled to maintain a utilization of the resource of the device of the computer system 100 below a maximum threshold. Using the scheduling module 206, any number of jobs may be scheduled and the time for execution of each job may be determined so that the resource of the device is maintained below the maximum threshold. As may be appreciated, the time to execute a first job may be different than the time to execute a second job, or the time to execute the first job may be the same as the time to execute the second job.

In one example, the multiple jobs may include a first job and a second job. Each of the first and second jobs may use the processing bandwidth (e.g., resource) of the first processor 112 (e.g., device). The execution profiles of the first and second jobs may indicate that the processing bandwidth would exceed 90% utilization, which for this example will be considered the maximum threshold, if the first and second jobs began execution at the same time. Accordingly, the scheduling module 206 may determine a schedule that begins execution of the first job at a first time and delays execution of the second job until a second time. With such scheduling, the utilization of the first processor 112 may be maintained below 90% utilization.

In one embodiment, the apparatus 200 includes the execution module 208 that submits the multiple jobs for execution based on the schedule. The execution module 208 may submit each job for execution as the scheduled time arrives, or the execution module 208 may submit all jobs for execution as a single batch job that executes the individual jobs based on the determined schedule. As may be appreciated, by submitting each job for execution as the scheduled time arrives, the execution module 208 may allow for changes in scheduling that may occur while a job is being executed.

Figure 3:
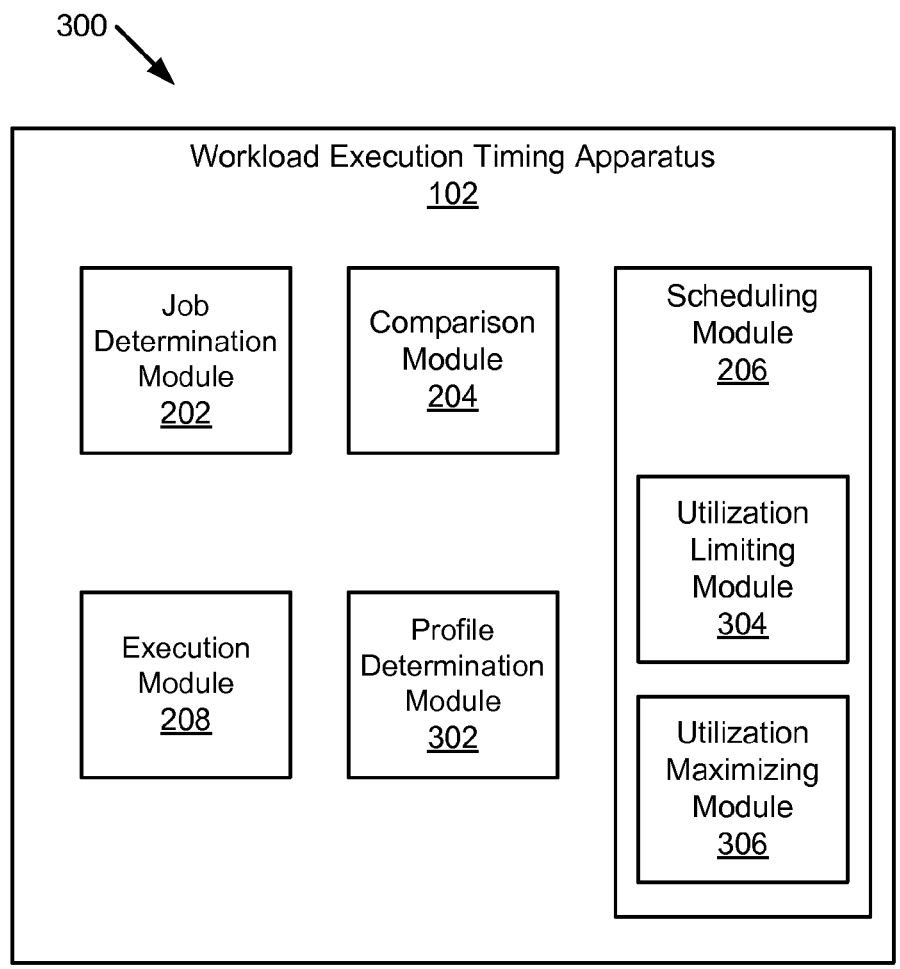
FIG. 3 is a schematic block diagram illustrating another embodiment of an apparatus for workload execution timing in accordance with one embodiment of the present invention.

FIG. 3 is a schematic block diagram illustrating another embodiment of an apparatus 300 for workload execution timing in accordance with one embodiment of the present invention. The apparatus 300 includes one embodiment of the workload execution timing apparatus 102 with the job determination module 202, the comparison module 204, the scheduling module 206, and the execution module 208, which are substantially similar to those described above in relation to the apparatus 200 of FIG. 2. In various embodiments, the apparatus 300 may include a profile determination module 302, a utilization limiting module 304, and a utilization maximizing module 306, which are described below.

In one embodiment, the apparatus 300 includes the profile determination module 302 that determines the execution profile of each job of the multiple jobs based on a prior execution of the respective job. For example, the execution profile of a job may be recorded during execution of a job by monitoring a resource of a device used by the job during execution. Moreover, multiple execution profiles of a job may be recorded during execution of the job by monitoring one or more resources of one or more devices used by the job during execution. In certain embodiments, the execution profile of the job may be iteratively adjusted over time based on multiple different executions of the job.

In some embodiments, the execution profile of a job is typically more complex than merely an on/off type profile. For example, the execution profile may include a ramp up time period, a general execution time period (that may include time periods of greater resource utilization and lesser resource utilization), and a ramp down time period. The execution profile may also include multiple ramp up time periods, general execution time periods, and/or ramp down time periods. Accordingly, scheduling execution profiles for concurrent operation may be a complex procedure.

In some embodiments, the profile determination module 302 may determine the execution profile of each job by predicting the execution profile of the respective job. The execution profile of the job may be predicted using any suitable prediction method. For example, the execution profile of the job may be predicted using an execution profile of a similar job to the job for which the predicted execution profile is being determined. As another example, the execution profile of the job may be predicted based on the size of the job, the type of job, the number of lines of code for executing the job, and so forth.

In some embodiments, the execution profile of a job may change depending on a type of information handling device 104 that the job is running on and/or on the system configuration of the information handling device 104. Accordingly, a job may have different execution profiles that depend on the type of information handling device 104 and/or on the system configuration of the information handling device 104.

The apparatus 300, in another embodiment, includes the utilization limiting module 304 that maintains a utilization of one or more resources of one or more devices of the computer system 100 below a maximum threshold. In some embodiments, the utilization limiting module 304 may maintain all resources of all devices below a single maximum threshold, while in other embodiments, the utilization limiting module 304 may have different maximum thresholds for the one or more resources of the one or more devices. The maximum thresholds may be any suitable values, such as 70%, 75%, 80%, 90%, or 100% of a possible amount of the resource available. In certain embodiments, the maximum threshold may be greater than 100%, for example, in cases in which the actual usage is typically below the predicted usage. In some embodiments, the maximum thresholds may be selected to optimize performance of the computer system 100. The scheduling module 206 uses the utilization limiting module 304 to aid in determining when jobs are to be scheduled in order to maintain the use of the resources below the maximum thresholds.

In one embodiment, the apparatus 300 includes the utilization maximizing module 306 that maintains the utilization of resources such that at least one device of the computer system 100 has a utilization greater than a target utilization threshold. In another embodiment, the utilization maximizing module 306 schedules each job to maximize a time that the utilization of the resource of the device of the computer system 100 is above a target utilization threshold. In certain embodiments, the target utilization threshold is a desired utilization of a resource. For example, the desired utilization may be a utilization level defined in a service level agreement, a utilization established for budgeting purposes, a utilization based on cost of operation, and so forth. It should be noted that maximizing a time that the utilization of the resource of the device is above a target utilization threshold may include scheduling jobs such that the resource is used at a maximum level possible. Accordingly, the resource may be operated at or above the target utilization threshold for some periods of time and the resource may be operated below the target utilization threshold for other periods of time.

In some embodiments, the utilization maximizing module 306 may generally maximize all resources of all devices to be above a single target utilization threshold, while in other embodiments, the utilization maximizing module 306 may have different target utilization thresholds for the one or more resources of the one or more devices. The target utilization threshold may be any suitable threshold, such as 40%, 50%, 60%, or 75% of a possible utilization of the resource. As may be appreciated, the jobs may be scheduled so that an amount of time that the resource is above the target utilization threshold is maximized. However, there may be time during which the resource usage is below the target utilization threshold.

Figure 4A:
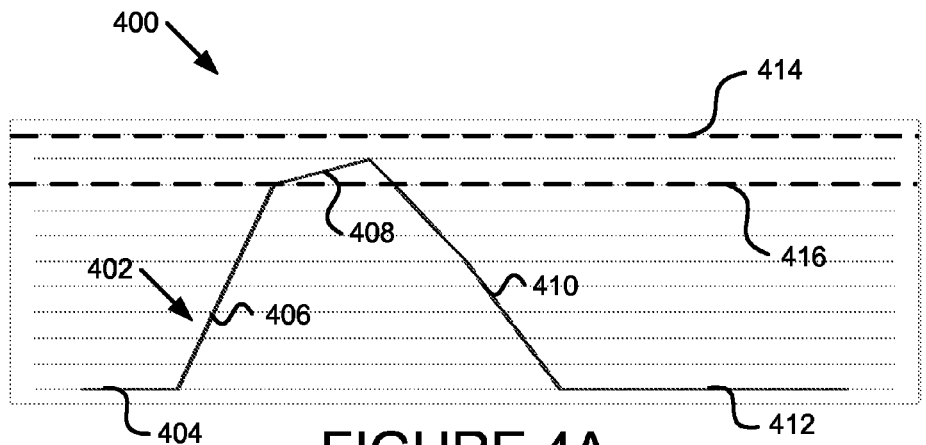
FIG. 4A is a line graph illustrating one embodiment of a first execution profile of a workload in accordance with one embodiment of the present invention.

FIG. 4A is a line graph 400 illustrating one embodiment of a first execution profile 402 of a workload in accordance with one embodiment of the present invention. The first execution profile 402 includes a pre-execution time period 404 during which substantially no amount of a resource of a device is used. As may be appreciated, substantially no amount of the resource of the device may be none, a nominal amount, or a small amount of the resource of the device that is used. For example, substantially no amount of the resource of the device may be 0%, 1%, or 5% of the resource of the device that is used.

The first execution profile 402 includes a ramp up time period 406 during which the first execution profile 402 transitions from using substantially no amount of the resource of the device to using some amount of the resource of the device. The first execution profile 402 includes a general execution time period 408 during which some amount of the resource of the device is used. As may be appreciated, the general execution time period 408 includes a time during which the maximum amount of the resource of the device is used.

The first execution profile 402 includes a ramp down time period 410 during which the first execution profile 402 transitions from using some amount of the resource of the device to using substantially no amount of the resource of the device. Moreover, the first execution profile 402 includes a post-execution time period 412 during which substantially no amount of a resource of a device is used. Also illustrated are a maximum threshold 414 and a target utilization threshold 416. The general execution time period 408 is substantially between the maximum threshold 414 and the target utilization threshold 416.

Figure 4B:
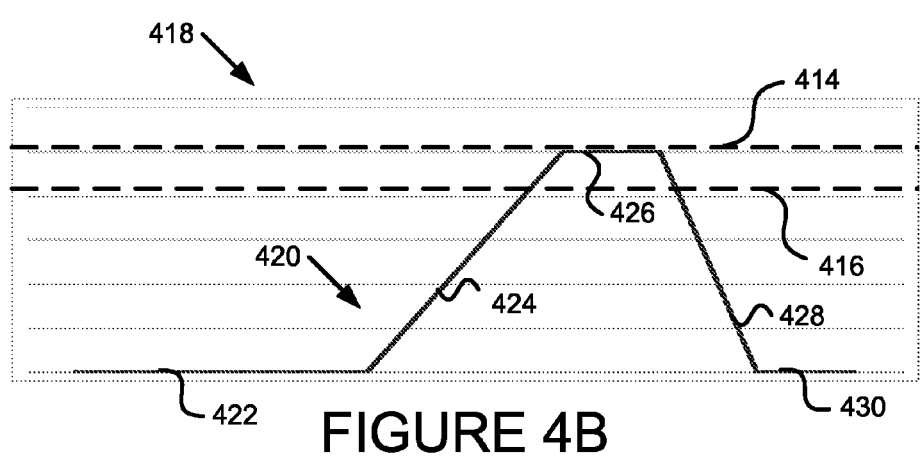
FIG. 4B is a line graph illustrating one embodiment of a second execution profile of a workload in accordance with one embodiment of the present invention.

FIG. 4B is a line graph 418 illustrating one embodiment of a second execution profile 420 of a workload in accordance with one embodiment of the present invention. The second execution profile 420 includes a pre-execution time period 422 during which substantially no amount of a resource of a device is used.

The second execution profile 420 includes a ramp up time period 424 during which the second execution profile 420 transitions from using substantially no amount of the resource of the device to using some amount of the resource of the device. The second execution profile 420 includes a general execution time period 426 during which some amount of the resource of the device is used. As may be appreciated, the general execution time period 426 includes a time during which the maximum amount of the resource of the device is used.

The second execution profile 420 includes a ramp down time period 428 during which the second execution profile 420 transitions from using some amount of the resource of the device to using substantially no amount of the resource of the device. Moreover, the second execution profile 420 includes a post-execution time period 430 during which substantially no amount of a resource of a device is used. The general execution time period 426 is substantially between the maximum threshold 414 and the target utilization threshold 416. As may be appreciated, in certain embodiments, the first execution profile 402 and/or the second execution profile 420 may be more complex than simple ramp up and ramp down type profiles as described in FIGS. 4A and 4B.

Figure 4C:
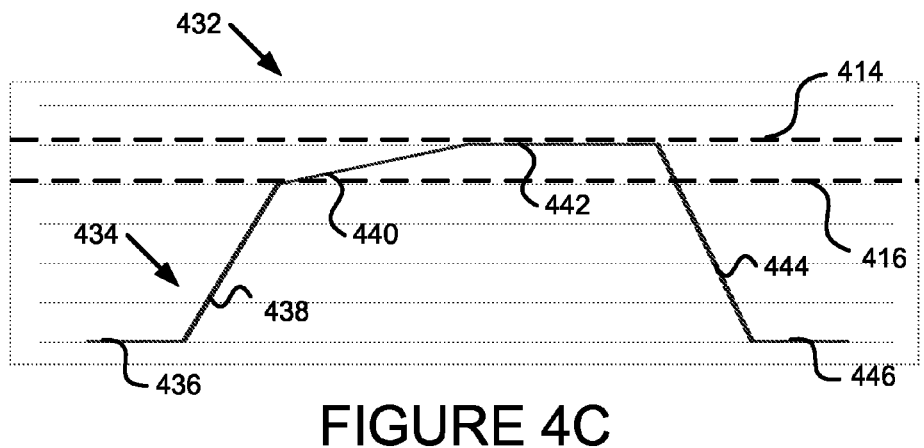
FIG. 4C is a line graph illustrating one embodiment of a combined execution profile including the first execution profile of FIG. 4A and the second execution profile of FIG. 4B in accordance with one embodiment of the present invention.

FIG. 4C is a line graph 432 illustrating one embodiment of a combined execution profile 434 including the first execution profile 402 of FIG. 4A and the second execution profile 420 of FIG. 4B in accordance with one embodiment of the present invention. While only two jobs are combined to produce the combined execution profile 434, other embodiments may have more than two jobs to produce a combined execution profile. The combined execution profile 434 includes a pre-execution time period 436 during which substantially no amount of a resource of a device is used.

The combined execution profile 434 includes a ramp up time period 438 during which the combined execution profile 434 transitions from using substantially no amount of the resource of the device to using some amount of the resource of the device. The ramp up time period 438 includes the ramp up time period 406 of the first execution profile 402.

The combined execution profile 434 includes a first general execution time period 440 and a second general execution time period 442 during which some amount of the resource of the device is used. As may be appreciated, the first and second general execution time periods 440 and 442 include a time during which the maximum amount of the resource of the device is used. In this embodiment, the first and second general execution time periods 440 and 442 include the general execution time period 408 and the ramp down time period 410 of the first execution profile 402, and the first and second general execution time periods 440 and 442 include the ramp up time period 424 and the general execution time period 426 of the second execution profile 420. Furthermore, the first and second general execution time periods 440 and 442 include a time during which the ramp down time period 410 of the first execution profile 402 overlaps with the ramp up time period 424 of the second execution profile 420.

The combined execution profile 434 includes a ramp down time period 444 during which the combined execution profile 434 transitions from using some amount of the resource of the device to using substantially no amount of the resource of the device. The ramp down time period 444 includes the ramp down time period 428 of the second execution profile 420. Moreover, the combined execution profile 434 includes a post-execution time period 446 during which substantially no amount of a resource of a device is used.

As illustrated, the first execution profile 402 and the second execution profile 420 are scheduled so that the combined execution profile 434 does not exceed the maximum threshold 414. Furthermore, the first execution profile 402 and the second execution profile 420 are scheduled so that a time that the combined execution profile 434 is greater than the target utilization threshold 416 is maximized. It should be noted that even though the time that the combined execution profile 434 is greater than the target utilization threshold 416 is maximized, the combined execution profile 434 may dip below the target utilization threshold 416 during operation of one load or a combination of loads.

Figure 5:
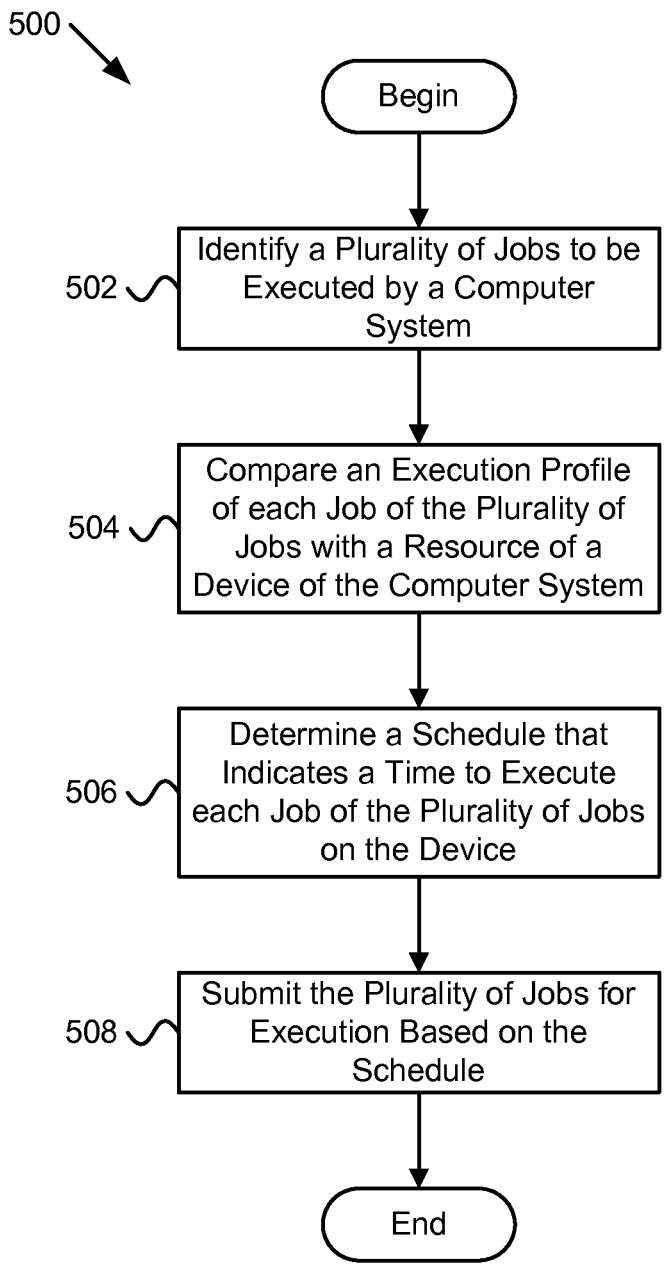
FIG. 5 is a schematic flow chart diagram illustrating one embodiment of a method for workload execution timing in accordance with one embodiment of the present invention.

FIG. 5 is a schematic flow chart diagram illustrating one embodiment of a method 500 for workload execution timing in accordance with one embodiment of the present invention. The method 500 begins and identifies 502 multiple jobs to be executed by the computer system 100. In certain embodiments, the job determination module 202 may identify 502 the multiple jobs to be executed by the computer system 100.

The method 500 compares 504 an execution profile of each job of the multiple jobs with a resource of a device (e.g., hardware 106) of the computer system 100. In some embodiments, the comparison module 204 may compare 504 the execution profile of each job of the multiple jobs with the resource of the device of the computer system 100. In certain embodiments, the execution profile of each job includes an amount of a resource of a device used by the respective job over time.

The method 500 determines 506 a schedule that indicates a time to execute each job of the multiple jobs on the device based on the comparison between the execution profile of each job of the multiple jobs and the resource of the device of the computer system 100. In one embodiment, the scheduling module 206 may determine 506 the schedule that indicates the time to execute each job. In certain embodiments, each job is scheduled to maintain a utilization of the resource of the device of the computer system 100 below a maximum threshold. The method 500 submits 508 the multiple jobs for execution based on the schedule and the method 500 ends. In one embodiment, the execution module 208 may submit 508 the multiple jobs for execution based on the schedule.

Figure 6:
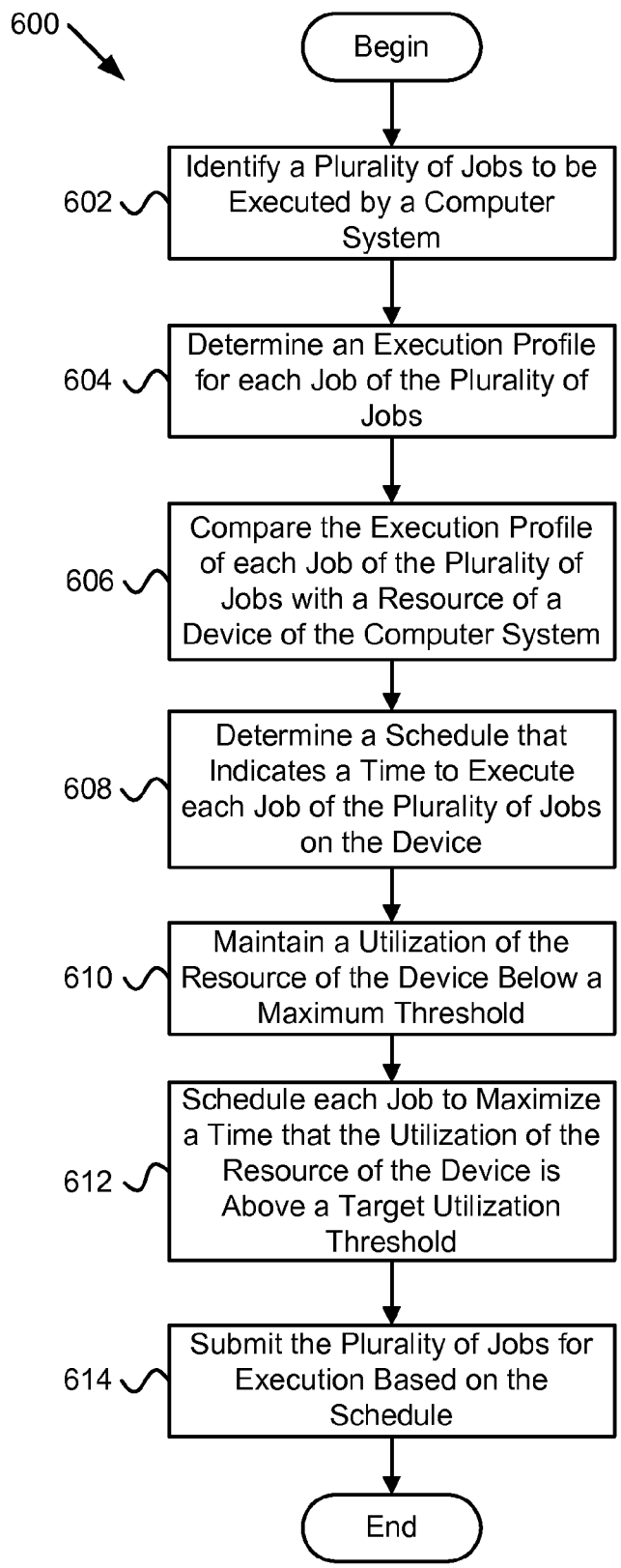
FIG. 6 is a schematic flow chart diagram illustrating another embodiment of a method for workload execution timing in accordance with one embodiment of the present invention.

FIG. 6 is a schematic flow chart diagram illustrating another embodiment of a method 600 for workload execution timing in accordance with one embodiment of the present invention. The method 600 begins and identifies 602 multiple jobs to be executed by the computer system 100. In certain embodiments, the job determination module 202 may identify 602 the multiple jobs to be executed by the computer system 100.

The method 600 determines 604 an execution profile for each job of the multiple jobs. In certain embodiments, the profile determination module 302 may determine 604 the execution profile for each job of the multiple jobs. In some embodiments, the execution profile for each job may be determined based on a prior execution of the respective job, while in other embodiments, the execution profile for each job may be determined based on an execution profile of a similar job to the job.

The method 600 compares 606 an execution profile of each job of the multiple jobs with a resource of a device (e.g., hardware 106) of the computer system 100. In some embodiments, the comparison module 204 may compare 606 the execution profile of each job of the multiple jobs with the resource of the device of the computer system 100. In certain embodiments, the execution profile of each job includes an amount of a resource of a device used by the respective job over time.

The method 600 determines 608 a schedule that indicates a time to execute each job of the multiple jobs on the device based on the comparison between the execution profile of each job of the multiple jobs and the resource of the device of the computer system 100. In one embodiment, the scheduling module 206 may determine 608 the schedule that indicates the time to execute each job. The method 600 maintains 610 a utilization of the resource of the device of the computer system 100 below a maximum threshold. In some embodiments, the utilization limiting module 304 maintains 610 the utilization of the resource of the device of the computer system 100 below the maximum threshold.

The method 600 schedules 612 each job to maximize a time that the utilization of the resource of the device is above a target utilization threshold. In certain embodiments, the utilization maximizing module 306 schedules 612 each job to maximize the time that the utilization of the resource of the device is above the target utilization threshold. The method 600 submits 614 the multiple jobs for execution based on the schedule and the method 600 ends. In one embodiment, the execution module 208 may submit 614 the multiple jobs for execution based on the schedule.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a job determination module that identifies a plurality of jobs to be executed by a computer system;
a comparison module that compares an execution profile of each job of the plurality of jobs with a resource of a device of the computer system, wherein the execution profile of each job comprises an amount of a resource of a device used by the respective job over time, the execution profile of one or more jobs of the plurality of jobs comprises at least one of a ramp up time period, a general execution time period, and a ramp down time period;
a profile determination module that determines the execution profile of each job of the plurality of jobs;
a scheduling module that determines a schedule that indicates a time to execute each job of the plurality of jobs on the device based on the comparison between the execution profile of each job of the plurality of jobs and the resource of the device of the computer system, wherein each job of the plurality of jobs is scheduled to maintain a utilization of the resource of the device of the computer system below a maximum threshold, and
wherein the ramp down time period of one or more jobs of the plurality of jobs is scheduled to overlap with the ramp up time period of one or more jobs of the plurality of jobs while maintaining the utilization of the resource of the device of the computer system below the maximum threshold and above a target utilization threshold; and
an execution module that submits the plurality of jobs for execution based on the schedule,
wherein at least a portion of said modules comprises one or more of hardware and program instructions, the program instructions stored on one or more computer readable storage media.

2. The apparatus of claim 1, a wherein the profile determination module determines the execution profile of each job of the plurality of jobs based on a prior execution of the respective job.

3. The apparatus of claim 1, a wherein the profile determination module determines the execution profile of each job of the plurality of jobs by predicting the execution profile of the respective job.

4. The apparatus of claim 3, wherein predicting the execution profile of the respective job comprises using an execution profile of a similar job to the respective job to predict the execution profile.

5. The apparatus of claim 1, wherein the execution profile of each job comprises the ramp up time period, the general execution time period, and the ramp down time period.

6. The apparatus of claim 5, wherein the ramp up time period comprises a first time period during which the execution profile transitions from using substantially no amount of a resource of a device to using some amount of the resource of the device, and the ramp down time period comprises a second time period during which the execution profile transitions from using some amount of the resource of the device to using substantially no amount of the resource of the device.

7. The apparatus of claim 5, wherein the plurality of jobs comprises a first job and a second job, and wherein the ramp down time period of the first job overlaps with the ramp up time period of the second job while maintaining the utilization of the resource of the device of the computer system below the maximum threshold.

8. The apparatus of claim 1, wherein the plurality of jobs comprises at least one complex job that is executed using multiple devices of the computer system.

9. The apparatus of claim 8, wherein the multiple devices comprise one or more of a processor, a storage device, a hard drive, a memory, a cache, a redundant array of independent disks ("RAID") card, a network adaptor, an input/output ("IO") component, a graphics interface, a graphics processor, an expansion device, and an external device.

10. The apparatus of claim 8, wherein the scheduling module comprises a utilization limiting module that maintains a utilization of resources of each device of the multiple devices of the computer system below the maximum threshold.

11. The apparatus of claim 10, wherein the scheduling module comprises a utilization maximizing module that maintains the utilization of resources such that at least one device of the multiple devices of the computer system has a utilization greater than the target utilization threshold.

12. The apparatus of claim 1, wherein the scheduling module comprises a utilization maximizing module that schedules each job of the plurality of jobs to maximize a time that the utilization of the resource of the device of the computer system is above the target utilization threshold.

13. A method comprising:
identifying a plurality of jobs to be executed by a computer system;
comparing an execution profile of each job of the plurality of jobs with a resource of a device of the computer system, wherein the execution profile of each job comprises an amount of a resource of a device used by the respective job over time, the execution profile of one or more jobs of the plurality of jobs comprises at least one of a ramp up time period, a general execution time period, and a ramp down time period;
determining the execution profile of each job of the plurality of jobs;
determining a schedule that indicates a time to execute each job of the plurality of jobs on the device based on the comparison between the execution profile of each job of the plurality of jobs and the resource of the device of the computer system,
wherein each job of the plurality of jobs is scheduled to maintain a utilization of the resource of the device of the computer system below a maximum threshold, and wherein the ramp down time period of one or more jobs of the plurality of jobs is scheduled to overlap with the ramp up time period of one or more jobs of the plurality of jobs while maintaining the utilization of the resource of the device of the computer system below the maximum threshold and above a target utilization threshold; and
submitting the plurality of jobs for execution based on the schedule.

14. The method of claim 13, wherein determining the execution profile of each job of the plurality of jobs comprises determining the execution profile of each job of the plurality of jobs based on a prior execution of the respective job.

15. The method of claim 13, wherein the execution profile of each job comprises the ramp up time period, the general execution time period, and the ramp down time period.

16. The method of claim 15, wherein the ramp up time period comprises a first time period during which the execution profile transitions from using substantially no amount of a resource of a device to using some amount of the resource of the device, and the ramp down time period comprises a second time period during which the execution profile transitions from using some amount of the resource of the device to using substantially no amount of the resource of the device.

17. The method of claim 15, wherein the plurality of jobs comprises a first job and a second job, and wherein the ramp down time period of the first job overlaps with the ramp up time period of the second job while maintaining the utilization of the resource of the device of the computer system below the maximum threshold.

18. The method of claim 13, wherein each job of the plurality of jobs is scheduled to maximize a time that the utilization of the resource of the device of the computer system is above the target utilization threshold.

19. The method of claim 13, wherein the plurality of jobs comprises at least one complex job that is executed using multiple devices of the computer system, and wherein the multiple devices comprise one or more of a processor, a storage device, a hard drive, a memory, a cache, a redundant array of independent disks ("RAID") card, a network adaptor, an input/output ("IO") component, a graphics interface, a graphics processor, an expansion device, and an external device.

20. A computer program product, the computer program product comprising a computer readable storage medium having program instructions embodied therewith, the program instructions executable by a processor for:
identifying a plurality of jobs to be executed by a computer system;
comparing an execution profile of each job of the plurality of jobs with a resource of a device of the computer system, wherein the execution profile of each job comprises an amount of a resource of a device used by the respective job over time, the execution profile of one or more jobs of the plurality of jobs comprises at least one of a ramp up time period, a general execution time period, and a ramp down time period;
determining the execution profile of each job of the plurality of jobs;
determining a schedule that indicates a time to execute each job of the plurality of jobs on the device based on the comparison between the execution profile of each job of the plurality of jobs and the resource of the device of the computer system,
wherein each job of the plurality of jobs is scheduled to maintain a utilization of the resource of the device of the computer system below a maximum threshold, and wherein the ramp down time period of one or more jobs of the plurality of jobs is scheduled to overlap with the ramp up time period of one or more jobs of the plurality of jobs while maintaining the utilization of the resource of the device of the computer system below the maximum threshold and above a target utilization threshold; and
submitting the plurality of jobs for execution based on the schedule.

* * * * *